United States Patent [19]

Fry et al.

[11] Patent Number: 4,465,292
[45] Date of Patent: Aug. 14, 1984

[54] STEERING OF VEHICLES

[75] Inventors: Timothy S. Fry, Dunchurch; Graham C. Cole, Coventry, both of England

[73] Assignee: GKN Group Services Limited, Smethwick, Warley, England

[21] Appl. No.: 386,287

[22] Filed: Jun. 8, 1982

[30] Foreign Application Priority Data

Jun. 11, 1981 [GB] United Kingdom ............... 8117999
Feb. 23, 1982 [GB] United Kingdom ............... 8205294

[51] Int. Cl.³ ............................................. B60G 9/00
[52] U.S. Cl. ............................................. 280/95 R
[58] Field of Search ........................... 280/95 R, 95 A

[56] References Cited

U.S. PATENT DOCUMENTS 3,020,060  2/1962  Rosenkrands ............... 280/95 R
3,746,119  7/1973  Cross ........................... 280/95 R
4,364,578  12/1982  Ikeda et al. ................... 280/95 R

FOREIGN PATENT DOCUMENTS 0000822  2/1979  European Pat. Off. .

Primary Examiner—Jospeh F. Peters, Jr.
Assistant Examiner—Kenneth R. Rice
Attorney, Agent, or Firm—Marshall, O'Toole, Gerstein, Murray & Bicknell

[57] ABSTRACT

A vehicle with a chassis, a rigid axle carrying steerable wheels, a steering box or idler unit mounted on the chassis and connected by a linkage to the steerable wheels, wherein the steering box is pivotally mounted on the chassis about a horizontal fore and aft axis, and there is a compensating link connecting the axle and the steering box. When relative movement between the axle and chassis occurs, any component of such movement which could otherwise produce an undesired steering movement of the wheels, the steering box is caused to pivot by the compensating link so that no undesired steering movement of the wheels occurs.

8 Claims, 3 Drawing Figures

U.S. Patent Aug. 14, 1984 Sheet 1 of 2 4,465,292

STEERING OF VEHICLES

BACKGROUND TO THE INVENTION

Field of the Invention

This invention relates to the steering of vehicles.

Particularly, the invention is concerned with the steering of a vehicle comprising a chassis (which term as used herein includes an integral body structure), a rigid axle mounted relative thereto by suspension means, and steerable wheels at the ends of the rigid axle. For steering such a vehicle, it is usual to provide a steering box mounted on the chassis and having an input member controllable by the vehicle's driver and an output member which is connected by a suitable linkage to the steerable wheels to control the position thereof. A disadvantage of such an arrangement is that, when relative movement occurs between the chassis and axle as the vehicle is used, this applies a steering motion to the wheels. It is an object of the present invention to overcome or reduce this disadvantage.

SUMMARY OF THE INVENTION

According to the invention, we provide a vehicle comprising a chassis, a rigid axle mounted relative thereto by suspension means and having steerable wheels at its ends, a steering control means mounted on the chassis and having a driver controllable input member and an output member, and a linkage connecting the output member of the steering control means to said steerable wheels for steering same, wherein the steering control means is mounted on the chassis of the vehicle for angular movement about an axis lying generally fore and aft of the vehicle, with its output member spaced from said axis, and there is a compensating link connecting the steering control means and axle such that when relative movement between the axle and the chassis occurs the steering control means is moved angularly about said axis in a sense such that no steering movement of the wheels is produced in consequence of said relative movement.

Said steering control means may be a steering box of conventional type, with a rotatable input member, or a steering idler with an input member which moves in a translatory sense under the control of steering box or other mechanism mounted elsewhere in the vehicle.

Preferably said linkage includes a track rod extending generally longitudinally of the axle and interconnecting the steerable wheels for controlling the relative steered positions thereof, and a link extending generally transversely of the vehicle and pivotally connected to the output member of the steering box and to the track rod in the central region thereof, said compensating link extending substantially parallel to said link.

The suspension means by which the axle and chassis are connected may be as described in our European Pat. No. 0,000,822, in which, inter alia, the axle beam is of shallow V shape in plan view and is supported at its centre by a universal pivotal connection with a generally vertically disposed member which is pivotally connected to the chassis for movement about an axis extending transversely of the vehicle. By this means, the centre of the axle is constrained to a motion of which the components are a substantially translatory motion in a vertical plane lying fore and aft of the vehicle, and universal pivotal motion. As applied to a vehicle incorporating such a suspension means, the invention provides that, viewed in side elevation, the pivotal connections between the track rod and link connecting it to the output of the steering box, and the axle and compensating link, lie substantially equal distances on opposite sides of the universal pivotal connection of the centre of the axle.

BRIEF DESCRIPTION OF THE DRAWINGS

The invention will now be described by way of example with reference to the accompanying drawings, of which.

DESCRIPTION OF PREFERRED EMBODIMENTS

Figure 1:
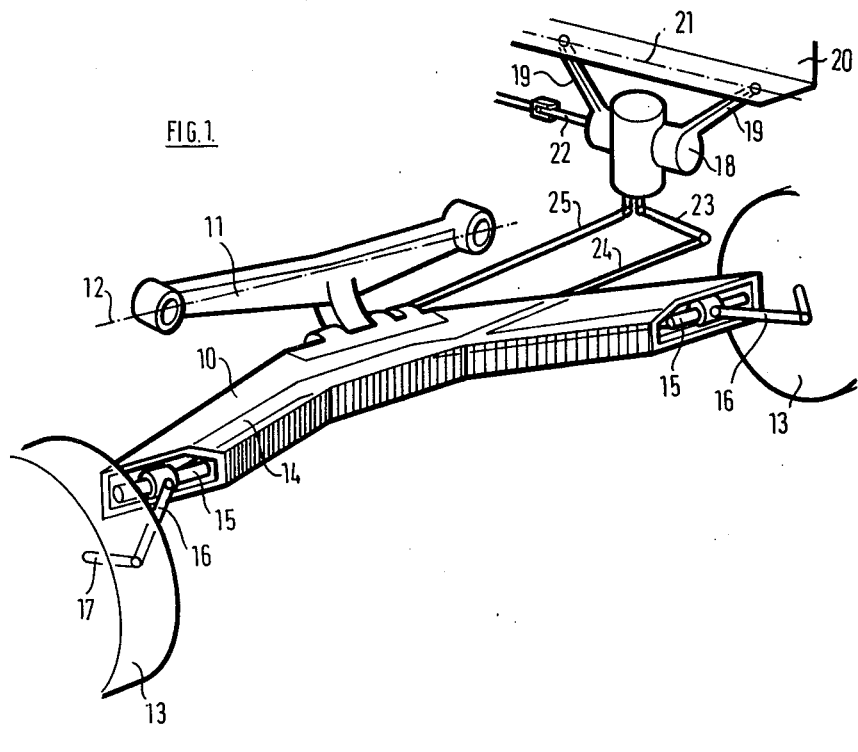
FIG. 1 is a diagrammatic perspective view looking forward of part of a vehicle incorporating the invention.

Referring firstly to FIG. 1 of the drawings there is illustrated an axle beam 10 which is of shallow V shape in plan view, supported at its centre by a wishbone member 11. The wishbone member is connected to the axle beam by a ball joint permitting a limited degree of universal pivotal movement, and is connected by means not shown to the vehicle chassis to provide for pivotal movement about an axis 12 extending transversely of the vehicle. Thus the centre of the axle beam is constrained to a motion of which the components are a universal pivotal motion provided by the ball joint connection with the wishbone member 11 and a translatory motion in a vertical plane extending fore and aft of the vehicle which arises from the pivotal connection of wishbone member about axis 12. A vehicle suspension system incorporating, inter alia, these elements is described in our European Pat. No. 0,000,822.

At the ends of the axle beam 10 are mounted for steering movement about respective substantially vertical steering axes, by means not shown, steerable wheels 13. A track rod 14 is disposed in the interior of the axle beam 10 (which is of box section), and is supported at its ends for sliding movement along elements 15 fixed to the axle beam and supported at its centre by means not shown. Links shown diagrammatically as 16, 17 connect the track rod 14 to the wheels at its ends for moving the wheels about their steering axes and determining the steered positions of the wheels relative to one another.

The vehicle chassis supports a steering box 18, which is pivotally secured by a bracket 19 to a chassis member 20 which extends fore and aft of the vehicle. The steering box can thus move pivotally about an axis 21 which extends fore and aft of the vehicle and is substantially horizontal. The steering box has a rotatable input member 22 to which is connected, by a suitable universally jointed shaft, a steering wheel operable by the vehicle's driver, and an output member 23 which is connected, by way of a suitable gearing arrangement within the steering box, to the input member. A link 24 is pivotally connected between the output member 23 and the track rod 14 adjacent to the centre thereof, entering the axle beam 10 through an aperture in the wall thereof.

Figure 2:
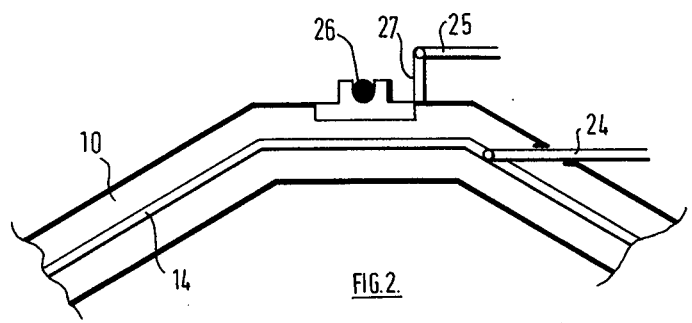
FIG. 2 is an enlarged view, in plan, of part of FIG. 1.

A compensating link 25 is pivotally connected at one end to rod 27 joined to the axle beam and at other end to the body of the steering box adjacent to the output member 23. The compensating link 25 lies substantially parallel to the link 24, and, if the assembly is viewed in side elevation (or in plan as shown in FIG. 2), is connected to the axle beam 10 at a distance in front of the centre of the ball joint 26 connecting the axle beam to the wishbone member 11 substantially equal to the distance of the pivotal connection of track rod 14 and link 24 behind the centre of such ball joint. In plan view, the link 24 and compensating link 25, and output member 23 and a notional line joining the points of connection of the link 24 to the track rod 14 and the compensating link 25 to the axle beam 10, form a parallelogram.

The operation of this assembly will be described by considering firstly the conditions which would obtain if the steering box were rigidly mounted to the vehicle chassis and there were no compensating link 25. Relative movement occuring between the axle beam and vehicle chassis would have lateral components such that steering movement would be applied to the wheels as a result thereof. This is undesirable. By the pivotal mounting of the steering box about the fore and aft axis 21, and the provision of compensating link 25, however, such relative movement also moves the steering box bodily so that there is no resultant relative motion appearing between the track rod 14 and axle beam 10.

In other words, any lateral component of movement of the axle beam 10 is fed back to the steering box by compensating link 25 so that no steering movement of the wheels results.

It would be expected that such swinging motion of the steering box would have an effect on the input 22 and thus produce some steering effect, but in fact the gearing ration which applies between the input and output members of the steering box is such that this effect is negligible.

Although the invention has been described above in relation to an axle beam supported at its centre by the wishbone member 11, the invention is applicable to rigid axles sprung by other means which may result in unwanted steering effects if a conventional steering system is utilised.

Figure 3:
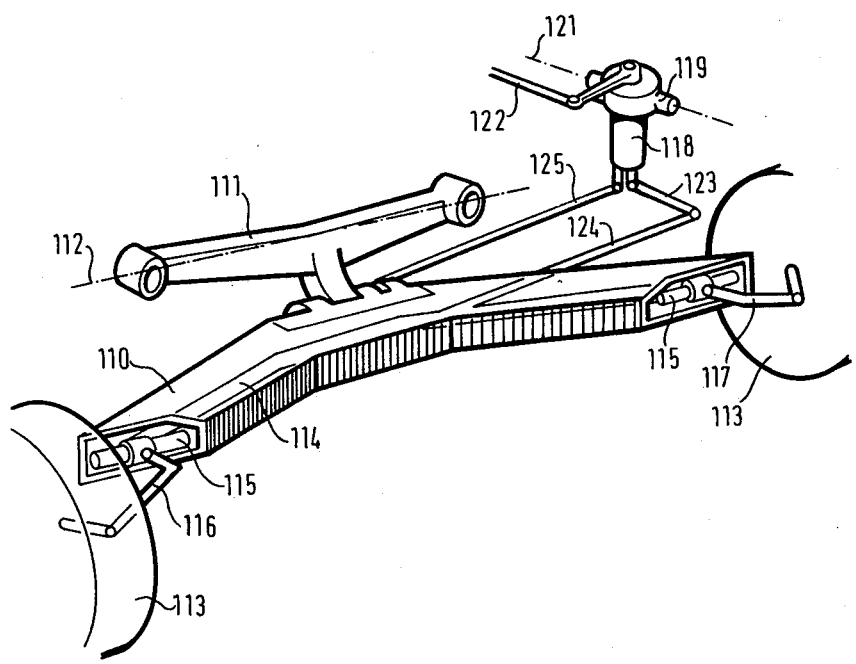
FIG. 3 is a perspective view of a further embodiment of the invention.

Referring now to FIG. 3 of the drawings, this shows an embodiment which is generally similar to that of FIGS. 1 and 2 and in which like components are identified by the same reference numerals with the addition of 100. In the embodiment of FIG. 3, however, there is a steering idler unit 118 instead of the steering box 18, the idler unit having an input member 122 and an output member 123. The input member 122 moves longitudinally, under the control of a steering box mounted at a remote location on the vehicle's chassis or from another idler or other mechanism associated with a further steered axle. Movement of the axle relative to the idler unit 118 is compensated by link 125 causing angular movement of the idler unit about axis 121, in the same manner as described above in relation to FIGS. 1 and 2.

We claim:

1. A vehicle comprising a chassis, a rigid axle mounted relative thereto by suspension means and having steerable wheels at its ends, a steering control means mounted on the vehicle chassis and having a driver controllable input member and an output member, a track rod extending generally longitudinally of the axle and interconnecting the steerable wheels for controlling the relative steered positions thereof, a link extending generally transversely of the vehicle and pivotally connected to said output member of the steering control means and to the track rod in the central region thereof, wherein the steering control means is mounted on the chassis of the vehicle for angular movement about an axis lying generally fore and aft of the vehicle, with its output member spaced from such axis, and a compensating link extending substantially parallel to said link and connected to the steering control means and axle so that when relative movement between the axle and chassis occurs the steering control means is moved angularly about said axis in a sense such that no steering movement of the wheels is produced in consequence of said relative movement.

2. A vehicle according to claim 1 wherein said steering control means comprises an idler unit, having a longitudinally movable input member.

3. A vehicle according to claim 1 wherein said axle is supported at its centre by a joint permitting universal pivotal movement, and wherein, viewed in side elevation, the points of connection of said compensating link to the axle and of said first link to said track rod lie substantially equal distances on opposite sides of said joint.

4. A vehicle according to claim 3 wherein said track rod is disposed within a hollow axle beam.

5. A vehicle according to claim 3 wherein said steering control means comprises a steering box having a rotatable input member.

6. A vehicle according to claim 3 wherein said steering control means comprises an idler unit, having a longitudinally movable input member.

7. A vehicle according to claim 1 wherein said steering control means comprises a steering box having a rotatable input member.

8. A vehicle according to claim 1 wherein said track rod is disposed within a hollow axle beam.

* * * * *